United States Patent

Aoki (10) Patent No.: US 11,999,136 B2
(45) Date of Patent: Jun. 4, 2024

(54) LAMINATED GLASS

(71) Applicant: AGC Inc., Chiyoda-ku (JP)

(72) Inventor: Tokihiko Aoki, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 945 days.

(21) Appl. No.: 16/983,037

(22) Filed: Aug. 3, 2020

(65) Prior Publication Data

US 2020/0361183 A1     Nov. 19, 2020

Related U.S. Application Data

(63) Continuation of application No. PCT/JP2019/015027, filed on Apr. 4, 2019.

(30) Foreign Application Priority Data

Apr. 5, 2018   (JP) ................................ 2018-073055

(51) Int. Cl.
    *B32B 17/10*      (2006.01)
    *B60K 35/00*      (2006.01)
    (Continued)

(52) U.S. Cl.
     CPC ........ *B32B 17/10605* (2013.01); *B32B 17/10* (2013.01); *B32B 17/10036* (2013.01);
    (Continued)

(58) Field of Classification Search
    CPC .............. B32B 17/10605; B32B 17/10; B32B 17/10036; B32B 17/10119;
    (Continued)

(56) References Cited

U.S. PATENT DOCUMENTS 6,506,487 B2   1/2003   Nagai
6,686,032 B1   2/2004   Nagai
(Continued)

FOREIGN PATENT DOCUMENTS

JP    2004284839 A   *   10/2004   ....... B32B 17/10036
JP    2015-151308 A      8/2015
(Continued)

OTHER PUBLICATIONS

International Search Report dated Jun. 11, 2019 in PCT/JP2019/015027 filed Apr. 4, 2019, 2 pages.

*Primary Examiner* — K. Boyle (74) *Attorney, Agent, or Firm* — Oblon, McClelland, Maier & Neustadt, L.L.P.

(57) ABSTRACT

To provide laminated glass for a vehicle, which is excellent in heat-shielding properties and which is capable of maintaining visible light transmittance to be high even when used for a long period of time. Laminated glass for a vehicle, which is laminated glass comprising a pair of glass plates and an intermediate film sandwiched between the pair of glass plates, wherein in a laminated glass specimen of 1 cm² cut out from the laminated glass in the thickness direction, the content of $CeO_2$ is at most 0.4 mg, and the content of total iron converted to $Fe_2O_3$ is at least 6.0 mg and at most 10.0 mg; and the intermediate film is made of a resin film containing tin-doped indium oxide fine particles having an average particle diameter of at most 0.1 μm.

20 Claims, 1 Drawing Sheet

(51) Int. Cl.
*C03C 3/087* (2006.01)
*C03C 3/095* (2006.01)
*C03C 27/04* (2006.01)
*H04N 23/54* (2023.01)
*B60K 35/60* (2024.01)

(52) U.S. Cl.
CPC .. *B32B 17/10119* (2013.01); *B32B 17/10614* (2013.01); *B32B 17/10743* (2013.01); *B60K 35/00* (2013.01); *C03C 3/087* (2013.01); *C03C 3/095* (2013.01); *C03C 27/048* (2013.01); *H04N 23/54* (2023.01); *B32B 2264/102* (2013.01); *B32B 2605/006* (2013.01); *B60K 35/60* (2024.01); *B60K 2360/785* (2024.01)

(58) Field of Classification Search
CPC ........ B32B 17/10614; B32B 17/10743; B32B 2264/102; B32B 2605/006; B60K 35/00; B60K 2370/785; C03C 3/087; C03C 3/095; C03C 27/048; H04N 23/54; H04N 23/57; B60R 11/02
See application file for complete search history.

(56) References Cited

U.S. PATENT DOCUMENTS

2004/0160688 A1   8/2004   Noguchi et al.
2017/0050415 A1   2/2017   Kanki et al.

FOREIGN PATENT DOCUMENTS

| | | | | |
|---|---|---|---|---|
| JP | 2015151308 A | * | 8/2015 | ............. B32B 17/06 |
| WO | WO 03/059837 A1 | | 7/2003 | |
| WO | WO 2005/044751 A1 | | 5/2005 | |
| WO | WO 2011/024788 A1 | | 3/2011 | |
| WO | WO-2017217230 A1 | * | 12/2017 | ....... B32B 17/10036 |

* cited by examiner

LAMINATED GLASS

This application is a continuation of PCT Application No. PCT/JP2019/015027, filed on Apr. 4, 2019, which is based upon and claims the benefit of priority from Japanese Patent Application No. 2018-073055 filed on Apr. 5, 2018. The contents of those applications are incorporated herein by reference in their entireties.

TECHNICAL FIELD

The present invention relates to laminated glass, more particularly to laminated glass for a vehicle, which is excellent in heat shielding properties and which is, at the same time, capable of maintaining visible light transmittance to be high.

BACKGROUND ART

Heretofore, as a method for improving the heat shielding properties of laminated glass, a technique of dispersing and blending infrared shielding fine particles such as tin-doped indium oxide (ITO) fine particles in an intermediate film, is known. Further, in recent years, various techniques have been developed in order to attain higher heat shielding properties.

For example, Patent Document 1 discloses laminated glass in which UV cut green glass obtained by adding oxides of iron, cerium, titanium, etc. to soda lime glass and an intermediate film containing ITO fine particles are combined. Further, Patent Document 2 discloses laminated glass using an intermediate film having a phthalocyanine compound added in addition to ITO fine particles.

However, a problem with such laminated glass is that the visible light transmittance of the laminated glass tends to decrease with time mainly due to UV irradiation, i.e. so-called solarization easily occurs, and a measure such as designing to make the visible light transmittance at the time of shipment (initial stage) to be high, has been taken.

On the other hand, recently, an information acquisition device such as a camera is often mounted on the vehicle interior side of laminated glass for a vehicle. In such a case, the information acquisition device is optimized according to the state (transmittance) of the laminated glass at the time of shipment. Therefore, if the visible light transmittance of the laminated glass decreases due to solarization, the accuracy of information acquisition at night may deteriorate, or the ability to distinguish road signs, etc. due to a change in color balance may decrease, which may cause a problem.

PRIOR ART DOCUMENTS

Patent Documents

Patent Document 1: WO2005/044751
Patent Document 2: WO2011/024788

DISCLOSURE OF INVENTION

Technical Problem

The present invention has been made from the above viewpoint, and it is an object of the present invention to provide laminated glass for a vehicle, which is excellent in heat shielding properties, has a small change in visible light transmittance even when used for a long period of time and is capable of maintaining the visible light transmittance to be high.

Solution to Problem

The laminated glass for a vehicle of the present invention is laminated glass comprising a pair of glass plates and an intermediate film sandwiched between the pair of glass plates, characterized in that in a glass specimen of 1 cm$^2$ cut out from the laminated glass in the thickness direction, the content of $CeO_2$ is at most 0.4 mg, and the content of total iron converted to $Fe_2O_3$ is at least 6.0 mg and at most 10.0 mg; and the intermediate film is made of a resin film containing tin-doped indium oxide fine particles having an average particle diameter of at most 0.1 μm.

Advantageous Effects of Invention

According to the present invention, it is possible to provide laminated glass for a vehicle, which is excellent in heat-shielding properties, has a small change in visible light transmittance even when used for a long period of time and is capable of maintaining the visible light transmittance to be high.

DESCRIPTION OF EMBODIMENTS

In the following, embodiments of the present invention will be described. However, the present invention is not limited to these embodiments, and these embodiments may be changed or modified without departing from the scope of the present invention.

The laminated glass for a vehicle in each embodiment is laminated glass comprising a pair of glass plates and an intermediate film sandwiched between the pair of glass plates, and has the following constituting requirements (1) and (2).

(1) In a laminated glass specimen of 1 cm$^2$ cut out from the laminated glass, the content of $CeO_2$ is at most 0.4 mg, and the content of total iron converted to $Fe_2O_3$ (hereinafter simply referred to as "total iron") is at least 6.0 mg and at most 10.0 mg.

(2) The intermediate film is made of a resin film containing tin-doped indium oxide (hereinafter referred to as "ITO") fine particles having an average particle diameter of at most 0.1 μm.

In the laminated glass of the present invention, by controlling the contents of $CeO_2$ and total iron within the predetermined ranges as defined in the above (1), it is possible to suppress a decrease in the visible light transmittance of the laminated glass with time by ultraviolet irradiation (hereinafter referred to also as "solarization"). It is known that solarization occurs when $CeO_2$ contained in the glass plate for the purpose of shielding ultraviolet rays will react with the iron component and will be colored by irradiation with ultraviolet rays. In the present invention, this is suppressed by satisfying the requirement of (1) in the laminated glass. As occurrence of solarization is suppressed, in the laminated glass for a vehicle, it is possible to suppress deterioration in the accuracy with time of e.g. the information acquisition device, etc. attached thereto.

Further, by satisfying the constituting requirements of (1) and (2), the laminated glass of the present invention can shield infrared rays and achieve sufficient heat shielding properties. Hereinafter, the laminated glass in one embodiment will be described with reference to the drawings.

Figure 1:
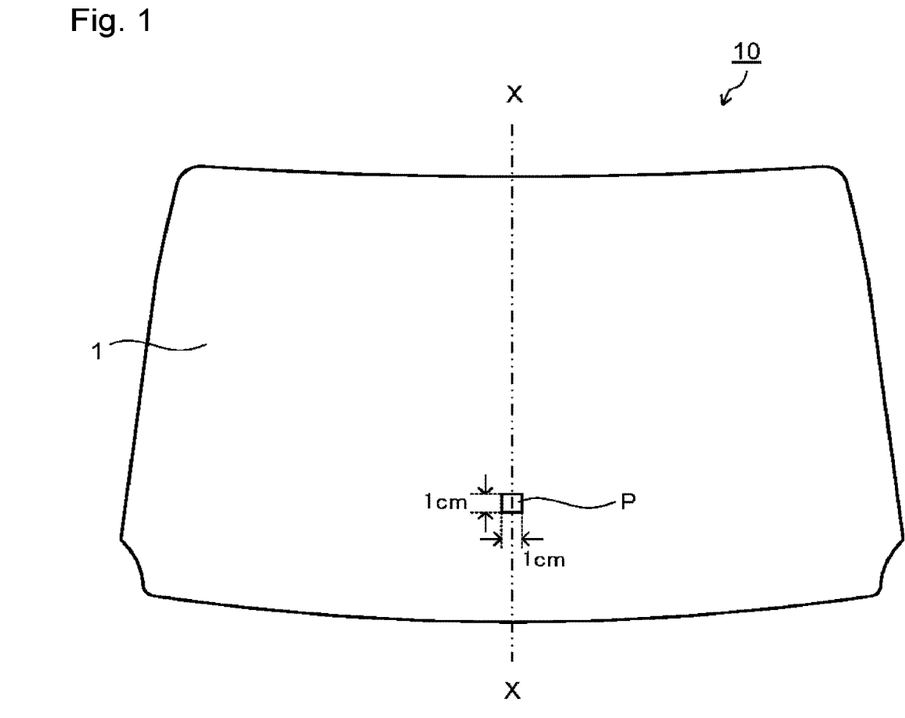
FIG. 1 is a schematic front view of one embodiment of the laminated glass of the present invention.
Figure 2:
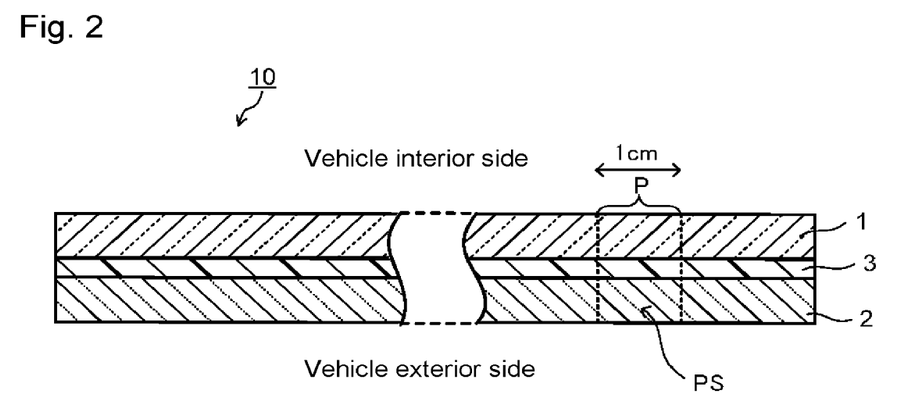
FIG. 2 is a schematic cross-sectional view taken along line X-X of the laminated glass shown in FIG. 1.

FIG. 1 is a schematic plan view of an example of laminated glass according to one embodiment. FIG. 1 is a schematic plan view of laminated glass to be used for a windshield of a vehicle as viewed from the interior side of the vehicle. FIG. 2 is a schematic cross-sectional view taken along line X-X of the laminated glass shown in FIG. 1. Further, the laminated glass of the present invention can be suitably used not only for a windshield of a vehicle but also for a door glass, a rear glass, a roof glass, etc.

In the present specification, the notations "upper" and "lower" indicate the upper and lower sides, respectively, when the laminated glass is mounted on a vehicle. When the laminated glass of the embodiment is mounted on a vehicle, one glass plate is located on the vehicle exterior side, and the other glass plate is located on the vehicle interior side. Here, the vehicle exterior side glass plate may be called the "outer plate" and the vehicle interior side glass plate may be called the "inner plate".

In the present specification, "substantially the same shape and same size" means having the same shape and same size as viewed by humans. Also in other cases, "substantially" has the same meaning as described above. Further, "to" representing a numerical range includes the upper limit value and the lower limit value.

In FIG. 1 and FIG. 2, in laminated glass 10, a first glass plate 1 (hereinafter referred to also as "inner plate 1") to be an inner plate, an intermediate film 3 and a second glass plate 2 (hereinafter referred to also as "outer plate 2") to be an outer plate, which respectively have main surfaces of the same shape and same size, are laminated in this order.

FIG. 1 shows a region P with 1 cm in the vertical direction, 1 cm in the vehicle width direction and 1 cm$^2$ in area, located below the central portion of the vehicle interior side main surface of the laminated glass 10. In the laminated glass 10, the requirement (1) is satisfied with respect to a laminated glass specimen PS (shown in FIG. 2) cut out from the laminated glass 10 in the thickness direction (direction parallel to the thickness) to meet the size (1 cm$^2$) of the region P. That is, in the laminated glass specimen PS, the content of $CeO_2$ is at most 0.4 mg, and the content of total iron is at least 6.0 mg and at most 10.0 mg.

As shown in FIG. 2, the laminated glass specimen PS has an inner plate, an intermediate film and an outer plate. Since the intermediate film is made of a resin film containing ITO fine particles, the contents of $CeO_2$ and total iron in the laminated glass specimen PS mean the total amounts of $CeO_2$ and total iron contained in the inner plate and the outer plate. Iron contained in the inner plate and the outer plate exists as FeO or $Fe_2O_3$. The inner plate and the outer plate usually contain both FeO and $Fe_2O_3$.

Here, since $CeO_2$, FeO and $Fe_2O_3$ are basically uniformly dispersed in the laminated glass 10, the position at which the laminated glass specimen PS is to be cut out, is not limited to the region P as shown in FIG. 1. It may be cut out from a region with an area of 1 cm$^2$ at an optional position and in an optional shape of the laminated glass 10.

The content of $CeO_2$ in the laminated glass specimen PS is preferably at most 0.3 mg, more preferably at most 0.2 mg, further preferably at most 0.1 mg, particularly preferably at most 0.05 mg, most preferably substantially not contained. In the present specification, the laminated glass specimen PS does not substantially contain $CeO_2$, means that the content is at most 0.01 mg.

The content of total iron in the laminated glass specimen PS is preferably at least 6.5 mg, more preferably at least 7.0 mg, further preferably at least 7.1 mg. The content of total iron is preferably at most 9.5 mg, more preferably at most 9.0 mg, further preferably at most 8.8 mg. The content of total iron is particularly preferably at least 7.1 mg and at most 8.8 mg.

There may or may not be a difference between the inner plate and the outer plate in the contents of $CeO_2$ and total iron. In the following, the respective constituting components of the laminated glass 10 will be described.

[Inner Plate and Outer Plate]

The inner plate 1 and the outer plate 2 in the laminated glass 10 may be made of inorganic glass. The inorganic glass may be soda lime glass, aluminosilicate glass, borosilicate glass, non-alkali glass, quartz glass, etc. Among them, soda lime glass is particularly preferred. As the inorganic glass, for example, float plate glass formed by a float method or the like may be mentioned. As the inorganic glass, glass that has been subjected to tempering treatment such as air-cooling tempering, chemical tempering or the like, may also be used.

As the soda lime glass to be used for the inner plate 1 and the outer plate 2, it is preferred to have substantially the following composition in terms of mass percentage expressed on the oxide basis in order to satisfy the requirement of (1). $SiO_2$: 65 to 75%, $Al_2O_3$: 0.1 to 5%, $Na_2O+K_2O$: 10 to 18%, CaO: 5 to 15%, MgO: 1 to 6%, total iron converted to $Fe_2O_3$: 0.60 to 1.00%, $CeO_2$: at most 0.1%. Hereinafter, the contents of the respective components in the soda lime glass are the contents in terms of mass percentage on the oxide basis, and are calculated based on the total of the components being 100%.

The contents of the respective components of $SiO_2$, $Al_2O_3$, $Na_2O+K_2O$, CaO and MgO in the soda lime glass can be suitably adjusted within the above ranges, respectively, by taking into consideration the physical properties required for the obtainable glass and the productivity, etc. at the time of production.

Further, the content of total iron is the total content of trivalent iron converted to $Fe_2O_3$ and divalent iron converted to $Fe_2O_3$. $Fe_2O_3$ being an oxide of trivalent iron is a component that absorbs ultraviolet rays, and FeO being an oxide of divalent iron is a component that absorbs thermal energy. As to the content of total iron in the glass, preferably the soda lime glass, to be used in the present invention, the above-mentioned upper limit value and lower limit value are set in order to satisfy the requirement of (1) when made to be laminated glass. The content of total iron is more preferably from 0.65 to 0.95%, further preferably from 0.70 to 0.95%.

The proportions of trivalent iron and divalent iron in total iron are adjusted by carefully considering the balance between ultraviolet absorption and heat ray absorption. In the glass, preferably in the soda-lime glass, to be used for the inner plate 1 and outer plate 2, the proportion of the content of divalent iron converted to $Fe_2O_3$ to total iron converted to $Fe_2O_3$ is preferably at least 20% and at most 30%. This proportion of the content of divalent iron is usually an index for the proportions of trivalent iron and divalent iron in total iron, which is called redox.

In the glass, preferably the soda lime glass, to be used for the inner plate 1 and the outer plate 2, when the redox is at least 20% and at most 30%, it is possible to realize high heat shielding properties and proper UV shielding properties, while maintaining the production efficiency and the visible light transmission to be at high levels. In the glass, preferably the soda lime glass, to be used for the inner plate 1 and the outer plate 2, the redox is more preferably from 22% to 28%, further preferably from 23% to 27%.

In the glass, preferably the soda lime glass, to be used for the inner plate 1 and the outer plate 2, the content of $CeO_2$ is more preferably at most 0.05%, further preferably at most 0.03%, particularly preferably substantially not contained, in order to satisfy the requirement of (1) when made to be laminated glass.

The composition of the glass, preferably the soda lime glass, constituting the inner plate 1 and the outer plate 2, may be the same or different depending on the required properties. For example, at the time of molding the glass plates by a gravity bending method or the like, if the outer plate 2 has a higher content of total iron, a strain will be less where the mold-releasing powder to be used at the time of molding becomes to be a foreign matter. Accordingly, from the viewpoint of favorably molding the glass plates by gravity bending, the content (mass %) of total iron is preferably larger in the outer plate 2 than in the inner plate 1. This reduces the influence on the operability, especially when the laminated glass is provided with an information acquisition device.

Even if the glass does not contain $CeO_2$, there is a concern that solarization may slightly occur due to the contained iron component. Therefore, from the viewpoint of minimizing the influence of solarization, the content (mass %) of total iron in the outer plate 2 receiving a large amount of ultraviolet irradiation is preferably made to be smaller than the content (mass %) of total iron in the inner plate 1. It is thereby possible to reduce the influence on operability, especially in a case where the laminated glass is provided with an information acquisition device.

In a case where in the outer plate 2 and the inner plate 1, the contents (mass %) of total iron are equal and the glass compositions are the same, both can be accurately molded into the same shape in bend molding of the outer plate 2 and the inner plate 1, such being preferred. It is thereby possible to reduce the influence on operability, especially in a case where the laminated glass is provided with an information acquisition device.

Further, from the viewpoint of suppressing solarization, the outer plate 2 preferably has a transmittance of light having a wavelength of 380 nm being at least 55% and at most 70% when spectroscopic measurement is conducted in accordance with JIS R3106 (1998). In the present specification, the transmittance of light having a wavelength λ [nm] when spectroscopic measurement is conducted in accordance with JIS R3106 (1998) is shown by "$T_λ$". For example, the transmittance of light having a wavelength of 380 nm when spectroscopic measurement is conducted in accordance with JIS R3106 (1998) is shown by "$T_{380}$".

$T_{380}$ in the outer plate 2 can be achieved by adjusting the contents of $CeO_2$ and total iron in the glass within the above ranges and adjusting the plate thickness. Since the outer plate 2 is directly exposed to the sun in particular, it is desirable that the content of $CeO_2$ be made to be smaller and $T_{380}$ be made to be larger. $T_{380}$ in the outer plate 2 is more preferably at least 56%, further preferably at least 58%. The upper limit of $T_{380}$ in the outer plate 2 is more preferably 68%.

From the viewpoint of suppressing solarization, the inner plate 1 preferably has $T_{380}$ being at least 50%. $T_{380}$ in the inner plate 2 can be achieved by adjusting the contents of $CeO_2$ and total iron in the glass within the above ranges and adjusting the plate thickness. $T_{380}$ in the inner plate 1 is more preferably at least 55%, further preferably at least 60%. The upper limit of $T_{380}$ in the inner plate 1 is preferably 75%.

The shapes of the inner plate 1 and the outer plate 2 may be flat plates, or may have a curvature on the entire surface or a part thereof. The surfaces of the inner plate 1 and the outer plate 2 to be exposed to the atmosphere may have a coating applied to impart a water repellent function, a hydrophilic function, an antifogging function, heat generation, an ultraviolet ray absorbing function, a low reflection function, a heat shielding function, etc. Further, the facing surfaces of the inner plate 1 and the outer plate 2 may usually have a coating containing a metal layer applied, such as a low radiation coating, an infrared ray shielding coating, a conductive coating, etc.

The plate thicknesses of the inner plate 1 and the outer plate 2 in the laminated glass 10 differ depending on the compositions thereof and the composition of the intermediate film 3, but, in general, each can be set to be from 0.1 to 10 mm. The total thickness of the inner plate 1 and the outer plate 2 is preferably at least 3.5 mm and at most 4.8 mm, more preferably from 3.6 to 4.5 mm, further preferably from 3.7 to 4.3 mm, from the viewpoint of achieving both strength, sound insulation, and weight reduction.

The plate thickness of the inner plate 1 is preferably from 1.55 to 2.35 mm, more preferably from 1.75 to 2.35 mm. The plate thickness of the outer plate 2 is preferably at least 1.9 mm, since flying stone impact resistance and sound insulation will be good, and is preferably at most 2.35 mm from the viewpoint of weight reduction. The plate thickness of the outer plate 2 is more preferably from 1.95 to 2.05 mm. Further, it is preferred that the plate thickness of the outer plate 2 is larger than the plate thickness of the inner plate 1. The difference in plate thickness between the two is preferably from 0 to 0.5 mm, more preferably from 0 to 0.3 mm. When the difference between the plate thicknesses of the two is within the above range, it is possible to reduce the strain caused by the difference in bendability between the inner plate 1 and the outer plate 2 during bending and the difference between the shapes of the two. Therefore, when the difference between the plate thicknesses of the two is within the above range, it is possible to satisfy both the thickness of the outer plate that ensures the strength against flying stones and prevention of the weight of the laminated glass 10 from becoming excessive, while making the quality of the molded product to be sufficiently practical.

The combination of the plate thicknesses of the inner plate 1 and the plate thickness of the outer plate 2 may, for example, be the inner plate 1 being 2.3 mm, the outer plate 2 being 2.3 mm and the total being 4.6 mm; the inner plate 1 being 2.0 mm, the outer plate 2 being 2.3 mm and the total being 4.3 mm; the inner plate 1 being 2.0 mm, the outer plate 2 being 2.0 mm and the total being 4.0 mm; the inner plate 1 being 1.8 mm, the outer plate 2 being 2.0 mm and the total being 3.8 mm; or the inner plate 1 being 1.6 mm, the outer plate 2 being 2.0 mm and the total being 3.6 mm. Among them, in a case where the strength against flying stones and sound insulation are important, it is most preferred that both the outer plate 2 and the inner plate 1 are 2.3 mm in plate thickness. Further, in a case where the weight reduction and sensitivity of the imaging device (camera) are important, it is most preferred that the thickness of the outer plate 2 is 2 mm and the thickness of the inner plate 1 is 1.8 mm. Further, the inner plate 1 or the outer plate 2 may have a wedge shape in cross-section, and the plate thickness in such a case may satisfy the above range at the portion where the plate thickness is maximum.

[Intermediate Film]

The intermediate film 3 in the laminated glass 10 is a flat film-like layer having a main surface having the same shape and size as the main surfaces of the inner plate 1 and the outer plate 2 and having a thickness as described later. The intermediate film 3 is inserted between the inner plate 1 and the outer plate 2 and has a function of adhering them and integrating them as laminated glass 10. Since the intermediate film 3 satisfies the requirement of (2), that is, is made of a resin film containing ITO fine particles having an average particle diameter of at most 0.1 μm, the laminated glass 10 has excellent heat shielding properties. Further, the ITO fine particles are usually present as dispersed in the resin film.

Since the average particle diameter of the ITO fine particles is at most 0.1 μm, the ITO fine particles can be sufficiently dispersed in the resin film, and at the same time, it is possible to prevent formation of fogging (increase of haze) due to scattering caused by the ITO fine particles, in the obtainable laminated glass 10. The lower limit of the average particle diameter of the ITO fine particles is preferably 0.001 μm from the viewpoint of heat shielding properties and productivity. The upper limit of the average particle diameter of the ITO fine particles is preferably 0.08 μm.

The above "average particle diameter" can be measured by observing a cross-sectional micrograph (TEM) of the cross section of an optional portion of the intermediate film and calculating an average value of the particle diameters of randomly extracted 100 ITO fine particles.

The content of the ITO fine particles to the total amount of the intermediate film 3 is preferably at least 0.1% by mass and at most 0.5% by mass, more preferably at least 0.2% by mass and at most 0.3% by mass, with a view to securing sufficient heat shielding properties, while the intermediate film 3 maintains mechanical strength and the laminated glass 10 maintains sufficient visible light transmittance.

The intermediate film 3 is basically composed of the ITO fine particles and a resin, and may contain optional other components. The resin may be a thermoplastic resin to be used for an intermediate film of usual laminated glass. The type of the thermoplastic resin is not particularly limited, and may be suitably selected from thermoplastic resins constituting known intermediate films.

The thermoplastic resin may be a polyvinyl acetal such as polyvinyl butyral (PVB), polyvinyl chloride (PVC), a saturated polyester, a polyurethane, an ethylene-vinyl acetate copolymer (EVA), an ethylene-ethyl acrylate copolymer, a cycloolefin polymer (COP), etc. As the thermoplastic resin, one type may be used alone, or two or more types may be used in combination.

The thermoplastic resin is selected in consideration of the balance of various properties, such as the glass transition point, transparency, weather resistance, adhesive strength, penetration resistance, impact energy absorption, moisture resistance, heat shielding properties, etc. When the balance of the above-mentioned various properties is taken into consideration, the thermoplastic resin to be used for the intermediate film 3 is preferably PVB, EVA, polyurethane or the like. The resin film to constitute the intermediate film 3 preferably contains a plasticizer together with the thermoplastic resin with a view to enhancing the adhesive force. Particularly when the thermoplastic resin is PVB, it is preferred that the intermediate film 3 contains a plasticizer.

As the case requires, the intermediate film 3 may contain one or more types of various additives, such as an infrared absorber other than ITO fine particles, an ultraviolet absorber, a fluorescent agent, an adhesiveness adjusting agent, a coupling agent, a surfactant, an antioxidant, a heat stabilizer, a light stabilizer, a dehydrating agent, a defoaming agent, an antistatic agent, a flame retardant, etc.

The thickness of the intermediate film 3 is preferably from 0.5 to 1.8 mm, more preferably from 0.7 to 1.5 mm, from the viewpoint of maintaining mechanical strength and productivity of laminated glass. If the film thickness of the intermediate film 3 exceeds 1.5 mm, a phenomenon so-called a plate misalignment phenomenon may occur in which the inner plate 1 and the outer plate 2 that sandwich the intermediate film 3 will be misaligned in a press-bonding step by an autoclave at the time of producing the laminated glass 10 as described later.

The intermediate film 3 is not limited to the single layer structure. For example, a multilayer resin film in which resin films having different properties (different loss tangents) are laminated, to be used for the purpose of improving sound insulation performance, as disclosed in JP-A-2000-272936, may be used as an adhesive layer.

Furthermore, in the laminated glass 10, the intermediate film 3 may be designed so that the cross-sectional shape in the vertical direction is wedge-shaped. The wedge shape may be such that the thickness of the intermediate film 3 decreases monotonically from the upper side to the lower side, or as long as the thickness of the upper side is larger than the thickness of the lower side, a design may partially have a portion where the thickness is uniform, or the wedge angle of the intermediate film may change in the plane.

In such a case, the difference between the upper side thickness and the lower side thickness of the intermediate film 3 is preferably at least 0.2 mm and at most 1 mm, whereby the difference between the upper side thickness and the lower side thickness of the laminated glass 10 is preferably made to be at least 0.2 mm and at most 1 mm. When the cross-sectional shape in the vertical direction of the intermediate film 3 is wedge-shaped, the thickness of the intermediate film 3 is preferably such that the thickness at the substantially central portion in the vertical direction in the front view is in the above-mentioned preferred thickness range. The difference between the thickness of the upper side and the thickness of the lower side in the laminated glass 10 is more preferably at most 0.8 mm, further preferably at most 0.6 mm, particularly preferably at most 0.5 mm. By forming the glass plate into a wedge shape in cross section, the difference between the thickness of the upper side and the thickness of the lower side of the laminated glass 10 may be made to be within the above range. When the difference between the thickness of the upper side and the thickness of the lower side of the laminated glass 10 is within the above range, the laminated glass can be suitably used as laminated glass corresponding to a head-up display.

[Laminated Glass]

The laminated glass 10 preferably has a visible light transmittance Tva according to JIS R3212 (1998) being at least 70% and at most 77%, a total solar radiation transmittance Tts according to ISO 13837 being at least 53% and at most 59%, and a transmittance of light having a wavelength of 850 nm when spectroscopically measured in accordance with JIS R3106 (1998) being at least 15% and at most 45%.

The visible light transmittance Tva of the laminated glass 10 is more preferably at least 71%. Further, from the viewpoint of obtaining sufficient heat shielding properties, the visible light transmittance Tva of the laminated glass 10 is more preferably at most 76%. The total solar radiation transmittance Tts of the laminated glass 10 is more preferably at least 53% and at most 56% from the viewpoint of maintaining the visible light transmittance Tva in the above range and obtaining sufficient heat shielding properties.

The light having a wavelength of 850 nm is used in the operation of various infrared communication systems (for example, VICS optical beacon or keyless entry system, rain sensor, etc.). $T_{850}$ of the laminated glass 10 is more preferably at least 18% and at most 40%, further preferably at least 19% and at most 35%, still further preferably at least 20% and at most 30%.

The laminated glass 10 is preferably such that, for example, a difference in visible light transmittance Tva before and after subjecting the laminated glass 10 to an ultraviolet irradiation test for 4,000 hours by using a 750 W mercury lamp by means of an ultraviolet irradiation device H75 (manufactured by Suga Test Instruments Co., Ltd.) is within 2%. The difference in visible light transmittance Tva before and after the ultraviolet irradiation test is more preferably within 1.5%, further preferably within 1.0%, still further preferably within 0.9%, particularly preferably within 0.6%. In a case where an information acquisition device such as a camera that receives visible light is provided on the vehicle interior side of the laminated glass, the difference in visible light transmittance Tva before and after the ultraviolet irradiation for 4,000 hours is preferably within 0.9%, more preferably within 0.6%, further preferably within 0.4%.

The laminated glass 10 preferably has a concealing layer made of dark-colored ceramic on the peripheral portion. The peripheral portion of the laminated glass means a region having a certain width from the edge portion of the laminated glass toward the central portion of the main surface when viewed from the front. The concealing layer may be formed in a frame shape over the entire peripheral portion, or may be formed in a belt shape over a part thereof.

The concealing layer suppresses, for example, deterioration of the adhesive that bonds the laminated glass 10 and the vehicle, from ultraviolet rays. The concealing layer can be formed by applying a preliminarily prepared dark ceramic forming liquid on a glass plate by screen printing or the like, followed by firing. The concealing layer is formed on at least one of the vehicle interior side surface of the outer plate 2 and the vehicle interior side surface of the inner plate 1. Further, in a case where the laminated glass 10 is provided with an information acquisition device, in order to suppress deterioration of the adhesive agent for bonding the bracket holding the information acquisition device and the laminated glass 10 from ultraviolet rays, a concealing layer may be formed around the information acquisition region of the laminated glass 10 to be the bonding region of the bracket.

On the main surface of the laminated glass 10, the area of the region excluding the concealing layer is preferably at least 8,000 cm². When the above area is at least 8,000 cm², the temperature rise in the vehicle can be effectively suppressed by using the laminated glass of the present invention. The area of the region excluding the concealing layer is more preferably at least 8,500 cm², further preferably at least 9,000 cm². Here, the above area is a value of the laminated glass 10 in a plan view.

It is preferred that the laminated glass 10 is provided with an information acquisition region. Since the laminated glass 10 of the present invention has a small change in visible light transmittance even when used for a long period of time, it is unlikely that, of the information acquisition device, the information acquisition accuracy will be reduced at night, or the identification ability of road signs, etc. due to changes in color balance will be reduced. It is preferred to provide an information acquisition device that receives visible light, on the vehicle interior side surface of the inner plate 1 of the laminated glass 10. Here, the information acquisition device is an imaging device, and a specific example is a camera.

[Production of Laminated Glass]

The laminated glass of the present invention can be produced by a commonly used known technique. In the laminated glass 10, a laminated glass precursor which is a laminated glass before press bonding, in which the inner plate 1, the intermediate film 3, and the outer plate 2 prepared respectively as described above are laminated in this order, is prepared. Further, in order to prevent bubbles from remaining in the laminated glass, it is preferred that embossing is formed on the surface of the intermediate film 3 for passing air through the surface. The embossing will disappear at the time of the following bonding.

This laminated glass precursor is put in a vacuum bag such as a rubber bag; this vacuum bag is connected to an exhaust system; and while suctioning (degassing) under reduced pressure so that the pressure (gauge pressure) inside the vacuum bag becomes to be a reduced pressure degree of from about −65 to −100 kPa (absolute pressure: about 36 to 1 kPa), the precursor is heated to a temperature of from about 70 to 110° C. Thereby, the laminated glass 10 in which the inner plate 1, the intermediate film 3 and the outer plate 2 are bonded together, is obtainable. Thereafter, as the case requires, the laminated glass is put into an autoclave, and press-bonding treatment is conducted by heating and pressing under conditions of a temperature of from about 120 to 150° C. and a pressure of from about 0.98 to 1.47 MPa. By the press-bonding treatment, it is possible to further improve the durability of the laminated glass.

EXAMPLES

In the following, the present invention will be described in more detail with reference to Examples. The present invention is not limited to the embodiments and Examples as described below. Ex. 1 to 6 are Examples of the present invention, and Ex. 7 to 12 are Comparative Examples.

[Preparation of Intermediate Film and Glass Plates]

As an intermediate film, a resin film having a thickness of 0.8 mm was prepared in which ITO fine particles having an average particle diameter of 0.04 μm were dispersed and blended in an amount of 0.25% by mass to the entire intermediate film. The resin film is a PVB resin film (hereinafter referred to also as "PVB film") containing 3GO (triethylene glycol di-2-ethylhexanoate) as a plasticizer, in addition to the ITO fine particles.

The above "average particle diameter" was measured by calculating the average value of particle diameters of 100 ITO fine particles randomly selected by observing a cross-sectional micrograph (JEM-1230, manufactured by JEOL Ltd.) of a cross section at one central portion of the intermediate film cut out with the following dimensions.

Further, glasses A to D having the glass compositions (represented by mass percentages on the oxide basis) shown in Table 1 were prepared, and glass plates having various plate thicknesses composed of glasses A to D were prepared. Here, the sizes of the main surfaces of the glass plates and the intermediate film were all rectangular with a length of 1,000 mm and a width of 1,500 mm.

TABLE 1

| Glass abbreviation | | A | B | C | D |
|---|---|---|---|---|---|
| Composition [% by mass] | $SiO_2$ | 70.5 | 72.6 | 70.6 | 72.4 |
| | $Al_2O_3$ | 1.6 | 0.2 | 1.5 | 0.2 |
| | CaO | 8.4 | 8.8 | 7.7 | 8.8 |
| | MgO | 4.7 | 3.8 | 4.5 | 3.8 |
| | $Na_2O + K_2O$ | 14.2 | 13.9 | 14.3 | 13.9 |
| | FeO | 0.11 | 0.15 | 0.18 | 0.20 |
| | $Fe_2O_3$ | 0.38 | 0.54 | 0.69 | 0.69 |
| | $CeO_2$ | 0.05 | 0.00 | 0.50 | 0.00 |
| Total iron converted to $F_2O_3$ [% by mass] | | 0.50 | 0.71 | 0.89 | 0.91 |
| Redox [%] | | 25 | 24 | 22 | 24 |

Ex. 1 to 12

Laminated glasses in Ex. 1 to 12 were produced by using the PVB film and various glass plates prepared as described above. In each Ex., a laminate was prepared in which the PVB film was sandwiched between the inner plate and the outer plate as shown in Table 2 or Table 3. The laminate was put in a vacuum bag, which was degassed so that the display of a pressure gauge became at most 100 kPa (gauge pressure); then heated to 120° C. and press-bonded; further heated and pressed in an autoclave for 60 minutes at a temperature of 135° C. under a pressure of 1.3 MPa; and finally cooled to obtain laminated glass.

In Tables 2 and 3, the types, plate thicknesses and $T_{380}$ of glass for the inner plate and outer plate used in each Ex. are shown. Further, the contents of total iron, FeO and $CeO_2$ in a laminated glass specimen of 1 cm² cut out from the laminated glass are shown.

[Evaluations]

With respect to the laminated glass obtained in each Ex., as the initial physical properties, the visible light transmittance Tva according to JIS R3212 (1998), the total solar radiation transmittance Tts according to ISO 13837, and the transmittance ($T_{850}$) of light having a wavelength of 850 nm were measured.

Further, the laminated glass was subjected to an ultraviolet irradiation test for 4,000 hours by using a 750 W mercury lamp by means of an ultraviolet irradiation device H75 (manufactured by Suga Test Instruments Co., Ltd.). The visible light transmittance Tva was measured upon expiration of 1,000 hours and 4,000 hours after the start of the test, and a value obtained by subtracting the initial visible light transmittance Tva from the obtained post-irradiation Tva was calculated as ΔTva. The results are shown in Tables 2 and 3.

Further, the change in color tone of the laminated glass in each of Ex. 4 and Ex. 7 as between before the test and upon expiration of 2,500 hours, was evaluated. As a measurement condition for the color tone, the color tone of the reflected light obtainable by irradiating the laminated glass with light from the light source A from the vehicle exterior side within an incident angle range of from 10 to 60°, is expressed by the CIE1976L*a*b* chromaticity coordinates. As a measuring instrument, UH4150 manufactured by Hitachi High Technology Co., Ltd. was used.

TABLE 2

| | | Ex. | 1 | 2 | 3 | 4 | 5 | 6 |
|---|---|---|---|---|---|---|---|---|
| Construction | Outer plate | Type of glass | B | D | D | D | D | D |
| | | Plate thickness [mm] | 2.0 | 2.0 | 2.0 | 2.0 | 2.3 | 2.3 |
| | | $T_{380}$ [%] | 65.7 | 58.9 | 58.9 | 58.9 | 55.2 | 55.2 |
| | Intermediate film | | PVB film in which ITO fine particles (average particle diameter: 0.04 μm) are dispersed in an amount of 0.25% by mass Film thickness: 0.8 mm | | | | | |
| | Inner plate | Type of glass | B | B | B | B | B | B |
| | | Plate thickness [mm] | 1.6 | 1.6 | 1.8 | 2.0 | 2.0 | 2.3 |
| | | $T_{380}$ [%] | 70.2 | 70.2 | 67.9 | 65.7 | 65.7 | 62.5 |
| | Components in glass of laminated glass | Total iron [mg] | 6.11 | 7.11 | 7.75 | 8.10 | 8.78 | 9.32 |
| | | FeO [mg] | 1.35 | 1.60 | 1.68 | 1.75 | 1.90 | 2.01 |
| | | $CeO_2$ [mg] | 0.00 | 0.00 | 0.00 | 0.00 | 0.00 | 0.00 |
| Evaluations | Initial physical properties | Tva [%] | 76.3 | 73.7 | 73.0 | 72.4 | 71.1 | 70.5 |
| | | Tts [%] | 59.0 | 56.2 | 55.6 | 55.0 | 53.8 | 53.0 |
| | | $T_{850}$ [%] | 32.7 | 26.6 | 25.2 | 23.8 | 21.3 | 19.6 |
| | After 1,000 hr of ultraviolet irradiation | Tva [%] after irradiation | 76.1 | 73.5 | 72.7 | 72.0 | 70.7 | 70.1 |
| | | ΔTva [%] | −0.21 | −0.24 | −0.32 | −0.38 | −0.41 | −0.45 |
| | After 4,000 hr of ultraviolet irradiation | Tva [%] after irradiation | 76.1 | 73.4 | 72.7 | 72.0 | 70.6 | 70.0 |
| | | ΔTva [%] | −0.26 | −0.26 | −0.35 | −0.41 | −0.50 | −0.55 |

TABLE 3

| | | Ex. | 7 | 8 | 9 | 10 | 11 | 12 |
|---|---|---|---|---|---|---|---|---|
| Construction | Outer plate | Type of glass | A | C | C | C | C | C |
| | | Plate thickness | 2.0 | 2.0 | 2.0 | 2.3 | 2.0 | 2.3 |

TABLE 3-continued

| Ex. | | 7 | 8 | 9 | 10 | 11 | 12 |
|---|---|---|---|---|---|---|---|
| | [mm] | | | | | | |
| | $T_{380}$ [%] | 74.7 | 53.7 | 53.7 | 49.7 | 53.7 | 49.7 |
| Intermediate film | | PVB film in which ITO fine particles (average particle diameter: 0.04 µm) are dispersed in an amount of 0.25% by mass Film thickness: 0.8 mm | | | | | | |
| Inner plate | Type of glass | A | A | A | A | C | C |
| | Plate thickness [mm] | 1.8 | 1.8 | 2.0 | 2.3 | 2.0 | 2.3 |
| | $T_{380}$ [%] | 76.2 | 76.2 | 74.7 | 72.5 | 53.7 | 49.7 |
| Components in glass of laminated glass | Total iron [mg] | 4.75 | 6.70 | 6.95 | 7.99 | 8.90 | 10.24 |
| | FeO [mg] | 1.05 | 1.40 | 1.45 | 1.67 | 1.80 | 2.07 |
| | $CeO_2$ [mg] | 0.48 | 2.73 | 2.75 | 3.16 | 5.00 | 5.75 |
| Evaluations | Initial physical properties | | | | | | |
| | Tva [%] | 77.8 | 75.3 | 74.7 | 72.7 | 72.4 | 70.1 |
| | Tts [%] | 61.1 | 58.8 | 58.2 | 56.3 | 56.3 | 54.2 |
| | $T_{850}$ [%] | 38.2 | 34.5 | 33.0 | 28.6 | 29.8 | 25.4 |
| After 1,000 hr of ultraviolet irradiation | Tva [%] after irradiation | 77.0 | 74.2 | 73.6 | 71.5 | 70.7 | 68.4 |
| | ΔTva [%] | −0.73 | −1.13 | −1.19 | −1.24 | −1.68 | −1.73 |
| After 4,000 hr of ultraviolet irradiation | Tva [%] after irradiation | 76.9 | 73.9 | 73.2 | 70.9 | 70.0 | 67.8 |
| | ΔTva [%] | −0.91 | −1.42 | −1.54 | −1.80 | −2.42 | −2.34 |

TABLE 4

| Ex. | | 4 | 7 |
|---|---|---|---|
| Before test | L* | 88.0 | 88.6 |
| | a* | −8.5 | −7.2 |
| | b* | 0.3 | −0.7 |
| After 2,500 hr | L* | 88.6 | 90.7 |
| | a* | −7.7 | −5.6 |
| | b* | 0.9 | 0.1 |
| Amount of change | Δa* | 0.8 | 1.6 |
| | Δb* | 0.6 | 0.8 |

The laminated glass in each of Ex. 1 to 6 which are Examples of the present invention, had a visible light transmittance Tva of at least 70% and at most 77%, a total solar radiation transmittance Tts of at least 53% and at most 59% and a transmission of light having a wavelength of 850 nm being within a range of at least 15% and at most 45%, as initial physical properties. Further, Tva was at least 70% and at most 77% also after 1,000 hours and after 4,000 hours from the start of the test, and ΔTva was at most 0.6% after 4,000 hours of ultraviolet irradiation, such being considered to be a level not to present an influence on the visibility outside the vehicle through the laminated glass and the acquisition accuracy of the acquisition device.

On the other hand, the laminated glass in each of Ex. 7 to 12 being Comparative Examples, had ΔTva after 4,000 hours of irradiation with ultraviolet rays being more than 0.6%, whereby there is a concern about an influence on the acquisition accuracy of the information acquisition device.

REFERENCE SYMBOLS

10: laminated glass, 1: first glass plate (inner plate), 2: second glass plate (outer plate), 3: intermediate film.

What is claimed is:

1. Laminated glass for a vehicle, which is laminated glass comprising a pair of glass plates and an intermediate film sandwiched between the pair of glass plates, characterized in that in a laminated glass specimen of 1 cm² cut out from the laminated glass in the thickness direction, the content of $CeO_2$ is at most 0.4 mg, and the content of total iron converted to $Fe_2O_3$ is at least 6.0 mg and at most 10.0 mg; and the intermediate film is made of a resin film containing tin-doped indium oxide fine particles having an average particle diameter of at most 0.1 µm.

2. The laminated glass according to claim 1, wherein of the pair of glass plates when positioned in a vehicle, one glass plate of the pair of glass plates that is positioned on an exterior of the vehicle as a side glass plate has a transmittance of light having a wavelength of 380 nm being at least 55% and at most 70% when spectroscopic measurement is conducted in accordance with JIS R3106 (1998).

3. The laminated glass according to claim 1, wherein of the pair of glass plates when positioned in a vehicle, one glass plate of the pair of glass plates that is positioned on an interior of the vehicle as a side glass plate has a transmittance of light having a wavelength of 380 nm being at least 50% when spectroscopic measurement is conducted in accordance with JIS R3106 (1998).

4. The laminated glass according to claim 1, wherein the content of the tin-doped indium oxide fine particles to the total amount of the intermediate film is at least 0.1% by mass and at most 0.5% by mass.

5. The laminated glass according to claim 1, wherein in each of the pair of glass plates, the proportion of the content of divalent iron converted to $Fe_2O_3$ to the total iron converted to $Fe_2O_3$ is at least 20% and at most 30%.

6. The laminated glass according to claim 1, wherein the laminated glass has a visible light transmittance Tva according to JIS R3212 (1998) being at least 70% and at most 77%, a total solar radiation transmittance Tts according to ISO 13837 being at least 53% and at most 59%, and a transmittance of light having a wavelength of 850 nm being at least 15% and at most 45% when spectroscopic measurement is conducted in accordance with JIS R3106 (1998).

7. The laminated glass according to claim 1, wherein the difference between the thickness of the upper side and the thickness of the lower side of the laminated glass is at least 0.2 mm and at most 1 mm.

8. The laminated glass according to claim 1, wherein the total of the thicknesses of the pair of glass plates is at least 3.5 mm and at most 4.8 mm.

9. The laminated glass according to claim 1, wherein in the pair of glass plates, the content (mass %) of total iron converted to $Fe_2O_3$ in the vehicle exterior side glass plate is larger than the content (mass %) of total iron converted to $Fe_2O_3$ in the vehicle interior side glass plate.

10. The laminated glass according to claim 1, wherein in the pair of glass plates, the content (mass %) of total iron converted to $Fe_2O_3$ in the vehicle exterior side glass plate is smaller than the content (mass %) of total iron converted to $Fe_2O_3$ in the vehicle interior side glass plate.

11. The laminated glass according to claim 1, wherein in the pair of glass plates, the content (mass %) of total iron converted to $Fe_2O_3$ in the vehicle exterior side glass plate is equal to the content (mass %) of total iron converted to $Fe_2O_3$ in the vehicle interior side glass plate.

12. The laminated glass according to claim 1, wherein either one of the pair of glass plates is soda lime glass.

13. The laminated glass according to claim 1, wherein the pair of glass plates when positioned in a vehicle, one glass plate of the pair of glass plates that is positioned an interior side of the vehicle has on at least one surface has a concealing layer made of dark-colored ceramic such that a portion of the at least one surface does not include the concealing layer in an amount of at least 8,000 $cm^2$.

14. The laminated glass according to claim 1, wherein the laminated glass is provided with an information acquisition device that when positioned in a vehicle, the information acquisition device is positioned on an interior side.

15. The laminated glass according to claim 14, wherein the information acquisition device is an imaging device.

16. The laminated glass according to claim 1, wherein the content of total iron converted to Fe2O3 is at least 7.1 mg and at most 9.5 mg.

17. The laminated glass according to claim 12, wherein the soda lime glass has a content of total iron converted to $Fe_2O_3$ being 0.60 mass % or more and 1.00 mass % or less.

18. The laminated glass according to claim 12, wherein the soda lime glass has a content of total iron converted to $Fe_2O_3$ being 0.65 mass % or more and 0.95 mass % or less.

19. The laminated glass according to claim 1, wherein the laminated glass has a transmittance of light having a wavelength of 850 nm being at least 15% and at most 30% when spectroscopic measurement is conducted in accordance with JIS R3106 (1998).

20. The laminated glass according to claim 1, wherein the laminated glass has a transmittance of light having a wavelength of 850 nm being at least 20% and at most 30% when spectroscopic measurement is conducted in accordance with JIS R3106 (1998).

* * * * *